(12) United States Patent
Lin (10) Patent No.: US 10,779,334 B2
(45) Date of Patent: Sep. 15, 2020

(54) BASE STATION, USER EQUIPMENT, AND METHOD FOR EARLY DATA TRANSMISSION

(71) Applicant: Institute For Information Industry, Taipei (TW)

(72) Inventor: Yi-Ting Lin, New Taipei (TW)

(73) Assignee: Institute For Information Industry, Taipei (TW)

(*) Notice: Subject to any disclaimer, the term of this patent is extended or adjusted under 35 U.S.C. 154(b) by 0 days.

(21) Appl. No.: 16/175,788

(22) Filed: Oct. 30, 2018

(65) Prior Publication Data

US 2019/0141753 A1 May 9, 2019

Related U.S. Application Data

(60) Provisional application No. 62/582,952, filed on Nov. 8, 2017.

(51) Int. Cl.
*H04W 74/08* (2009.01)
*H04W 76/27* (2018.01)
*H04W 88/08* (2009.01)
*H04W 88/02* (2009.01)

(52) U.S. Cl.
CPC ....... *H04W 74/0833* (2013.01); *H04W 76/27* (2018.02); *H04W 88/02* (2013.01); *H04W 88/08* (2013.01)

(58) Field of Classification Search
CPC . H04W 74/0833; H04W 76/27; H04W 88/08; H04W 88/02
See application file for complete search history.

(56) References Cited

U.S. PATENT DOCUMENTS

| 2005/0213541 A1* | 9/2005 | Jung ................. H04W 4/06 370/331 |
| 2009/0103511 A1 | 4/2009 | Marinier et al. |
| 2012/0127930 A1 | 5/2012 | Nguyen et al. |
| 2013/0242729 A1 | 9/2013 | Chen et al. |
| 2015/0223127 A1* | 8/2015 | Godin ................. H04W 36/30 370/331 |
| 2015/0305056 A1* | 10/2015 | Vangala ............... H04W 76/27 455/450 |
| 2016/0014815 A1* | 1/2016 | Vajapeyam ....... H04W 74/0833 370/329 |
| 2019/0045554 A1* | 2/2019 | Ye ...................... H04W 4/0833 |

OTHER PUBLICATIONS

Office Action to the corresponding Taiwan Patent Application rendered by the Taiwan Intellectual Property Office (TIPO) dated Aug. 27, 2019, 9 pages (including English translation).

* cited by examiner

*Primary Examiner* — Mohammad S Anwar
(74) *Attorney, Agent, or Firm* — Skaar Ulbrich Macari, P.A.

(57) ABSTRACT

A method for early data transmission in a random access procedure includes: a base station broadcasting system information; the base station receiving a random access request message which is transmitted by a user equipment according to a random access channel resource for the early data transmission; the base station determining an uplink grant; the base station transmitting a random access response message carrying the uplink grant to the user equipment; and the base station receiving an RRC (Radio Resource Control) request message carrying an early uplink data of the user equipment.

11 Claims, 6 Drawing Sheets

BASE STATION, USER EQUIPMENT, AND METHOD FOR EARLY DATA TRANSMISSION

PRIORITY

This application claims priority to U.S. Provisional Patent Application Ser. No. 62/582,952 filed on Nov. 8, 2017, which is hereby incorporated by reference herein in its entirety.

FIELD

Embodiments of the present invention relate to a base station, a user equipment and a method for early data transmission. More particularly, the embodiments of the present invention relate to a base station, a user equipment, and a method for early data transmission thereof in a random access procedure.

BACKGROUND

In many wireless communication systems, a user equipment must first perform a random access procedure with a base station to fight for a chance of establishing connection with the base station, and mutual data transmission between the user equipment and the base station can be achieved only after the connection is established therebetween. For example, under the architecture of Narrow Band Internet of Things (NB-IoT), the user equipment may establish connection with the base station according to the random access procedure specified by the Long Term Evolution (LTE), and the random access procedure comprises the transmission of the following five messages, which are respectively as follows: the user equipment transmits a random access request message (which is called a first message for short) to the base station; the base station transmits a random access response message (which is called a second message for short) to the user equipment; the user equipment transmits an RRC connection request message (which is called a third message for short) to the base station; the base station transmits an RRC connection setup message (which is called a fourth message for short) to the user equipment so that the user equipment enters an RRC connected mode; and the user equipment transmits an RRC connection completeness message (which is called a fifth message for short) to the base station.

According to the random access procedure specified by the LTE, the connection between the user equipment and the base station can be established only after the aforesaid five messages all take effect, and if any of the aforesaid five messages cannot take effect, then the corresponding message must be re-transmitted. In other words, mutual data transmission between the user equipment and the base station can be achieved only after the transmission of at least the aforesaid five messages, and if any of the aforesaid five messages cannot take effect during the random access procedure, then the user equipment must wait for more time to achieve mutual data transmission with the base station. Obviously, such a transmission manner will reduce the transmission efficiency of the data and the utilization ratio of the resource. Accordingly, an urgent need exists in the art to improve the aforesaid random access procedure so as to improve the transmission efficiency of the data and the utilization ratio of the resource.

SUMMARY

Provided is a base station that is capable of performing a random access procedure with a user equipment. The base station may comprise a transceiver and a processor. The transceiver may be configured to broadcast system information and receive a random access request message from the user equipment, wherein the system information may comprise a maximum size of transport block and configuration information of a random access channel resource for early data transmission, and the random access request message is transmitted by the user equipment according to the random access channel resource. The processor is electrically coupled to the transceiver and may be configured to determine an uplink grant (a size limitation of uplink data) for the user equipment. The transceiver may be configured to further: transmit a random access response message to the user equipment after receiving the random access request message, wherein the random access response message carries the uplink grant; and receive a radio resource control (RRC) request message from the user equipment after transmitting the random access response message, wherein the RRC request message carries an early uplink data from the user equipment.

Also provided is a user equipment for performing a random access procedure with a base station. The user equipment may comprise a transceiver and a processor. The processor may be configured to determine whether to perform early data transmission according to system information from the base station, and select a random access channel resource for the early data transmission when deciding to perform the early data transmission, wherein the system information may comprise a maximum size of transport block and configuration information of the random access channel resource for the early data transmission. The transceiver is electrically coupled to the processor and may be configured to: transmit a random access request message to the base station according to the random access channel resource. The transceiver may be further configured to: receive a random access response message from the base station after transmitting the random access request message, wherein the random access response message carries an uplink grant; and transmit an RRC request message to the base station according to the uplink grant after receiving the random access response message, wherein the RRC request message carries an early uplink data.

Further provided is a method for early data transmission in a random access procedure. The method for early data transmission may comprise:

broadcasting, by a base station, system information, wherein the system information comprises a maximum size of transport block and configuration information of a random access channel resource for the early data transmission;

receiving, by the base station, a random access request message from a user equipment, wherein the random access request message is transmitted by the user equipment according to the random access channel resource;

determining, by the base station, an uplink grant for the user equipment;

transmitting, by the base station, a random access response message to the user equipment after receiving the random access request message, wherein the random access response message carries the uplink grant; and receiving, by the base station, an RRC request message from the user equipment after transmitting the random access response message, wherein the RRC request message carries an early uplink data from the user equipment.

During the process of a random access procedure performed between the base station and the user equipment, the user equipment may carry uplink data in the radio resource control (RRC) request message transmitted to the base station by itself so as to transmit the data to the base station earlier. That is, the uplink data that originally can only be uploaded by the user equipment after the random access procedure is finished (i.e., after the fifth message takes effect) now can be transmitted during the random access process (i.e., the uplink data from the user equipment is transmitted earlier than the third message) so that the transmission efficiency of the data can be increased. Additionally, since the uplink data from the user equipment is transmitted earlier than the third message, the subsequent fourth message and/or fifth message may be optionally not performed depending on actual needs to release the resource for other applications, thereby improving the utilization ratio of the resource.

What is described above is not intended to limit the present invention, but only generally describes the technical problem that can be solved by the present invention, the technical means that can be adopted and the technical effect that can be achieved so that a person having ordinary skill in the art can preliminarily understand the present invention. Details of the embodiments of the present invention can be further understood by a person having ordinary skill in the art according to attached drawings and contents recorded in the following description of the preferred embodiments.

DETAILED DESCRIPTION

The present invention will be described hereinafter with reference to certain example embodiments thereof. However, these example embodiments are not intended to limit the present invention to only specific implementations, embodiments, examples, environment, applications, structures, processes or steps described in these example embodiments.

In the attached drawings, elements unrelated to the present invention are omitted from depiction, but may be implied by the attached drawings, and dimensions of elements and proportional relationships among individual elements in the attached drawings are only exemplary examples but not intended to limit the present invention. Unless stated particularly, same (or similar) element symbols may correspond to same (or similar) elements in the following description. Unless stated specifically, the number of each element described hereinafter may be one or more while it can be implemented.

Figure 1:
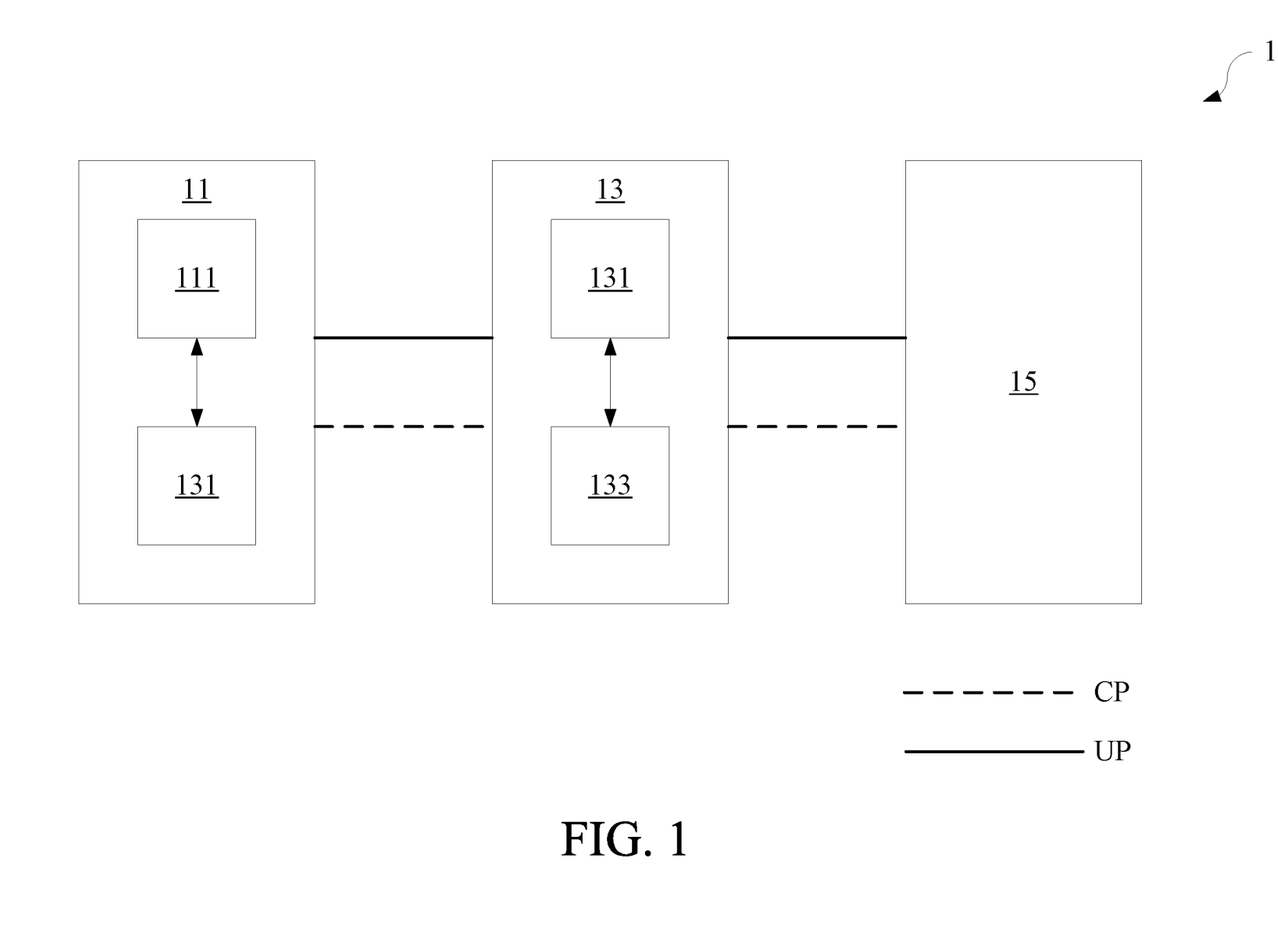
FIG. 1 illustrates a schematic view of a wireless communication system according to some embodiments.

FIG. 1 illustrates a schematic view of a wireless communication system according to some embodiments. Contents shown in FIG. 1 are only for illustrating embodiments of the present invention rather than for limiting the present invention. Referring to FIG. 1, a wireless communication system 1 may basically comprise a user equipment 11, a base station 13 and a core network 15. The wireless communication system 1 may be one of various communication systems, which are for example but not limited to a Narrow Band-IoT (NB-IoT) system, an enhanced Machine-Type Communication (eMTC) system, a massive Machine-Type Communications (mMTC) system or the like.

Depending on different applications, the user equipment 11 and the base station 13 can present different types. For example, the user equipment 11 may be one of electronic devices such as a mobile phone, a tablet computer, a notebook computer or the like, and the base station 13 may be one of base stations such as macrocells, microcells and picocells or the like, without being limited thereto. Additionally, depending on different applications, the core network 15 may present different types. For example, in the narrow band-IoT, the core network 15 may basically comprise a Mobility Management Entity (MME), a Serving Gateway (S-GW), a Packet Data Network Gateway (PDN GW) and a Home Subscriber Server (HSS), without being limited thereto. The basic architecture and function of the Mobility Management Entity (MME), the Serving Gateway (S-GW), the Packet Data Network Gateway (PDN GW) and the Home Subscriber Server (HSS) are already known by a person having ordinary skill in the art, and thus will not be further described herein.

Taking the LTE as an example, the user equipment 11, the base station 13 and the core network 15 may use a control plane CP to transmit messages and/or data, or uses a user plane UP to transmit messages and/or data. Transmission paths established by the control plane CP comprise paths between the user equipment 11 and the base station 13, as well as between the base station 13 and the mobility management entity of the core network 15. Transmission paths established by the user plane UP comprise paths between the user equipment 11 and the base station 13, between the base station 13 and the serving gateway of the core network 15, as well as between the serving gateway of the core network 15 and the packet data network gateway of the core network 15. Messages and/or data transmitted on the control plane CP are processed/controlled by the mobility management entity in the core network 15, and message and/or data transmitted on the user plane UP are processed/controlled by the serving gateway in the core network 15.

The user equipment 11 may comprise a processor 111 and a transceiver 113. In the user equipment 11, the processor 111 and the transceiver 113 are electrically connected (either via direction electrical connection or indirect electrical connection). The base station 13 may comprise a processor 131 and a transceiver 133. In the base station 13, the processor 131 and the transceiver 133 are electrically connected (either via direction electrical connection or indirect electrical connection).

Each of the processor 111 and the processor 131 may be one of various microprocessors or microcontrollers capable of signal processing. The microprocessor or microcontroller is a special integrated circuit that can be programmed and is capable of operating, storing, outputting/inputting or the like, and can receive and process various coded instructions, thereby performing various logical operations and arithmetical operations and outputting corresponding operational results. The processor 111 may be programmed to interpret various instructions so as to process the data in the user equipment 11 and execute various operations or programs. The processor 131 may be programmed to interpret various instructions so as to process the data in the base station 13 and execute various operations or programs.

Each of the transceiver 113 and the transceiver 133 may be formed of a transmitter and a receiver, and may comprise for example but not limited to communication elements such as an antenna, an amplifier, a modulator, a demodulator, a detector, an analog-to-digital converter, a digital-to-analog converter or the like. The transceiver 113 may enable the user equipment 11 to communicate and exchange data with an external device. The transceiver 133 may enable the base station 13 to communicate and exchange data with an external device.

Figure 2:
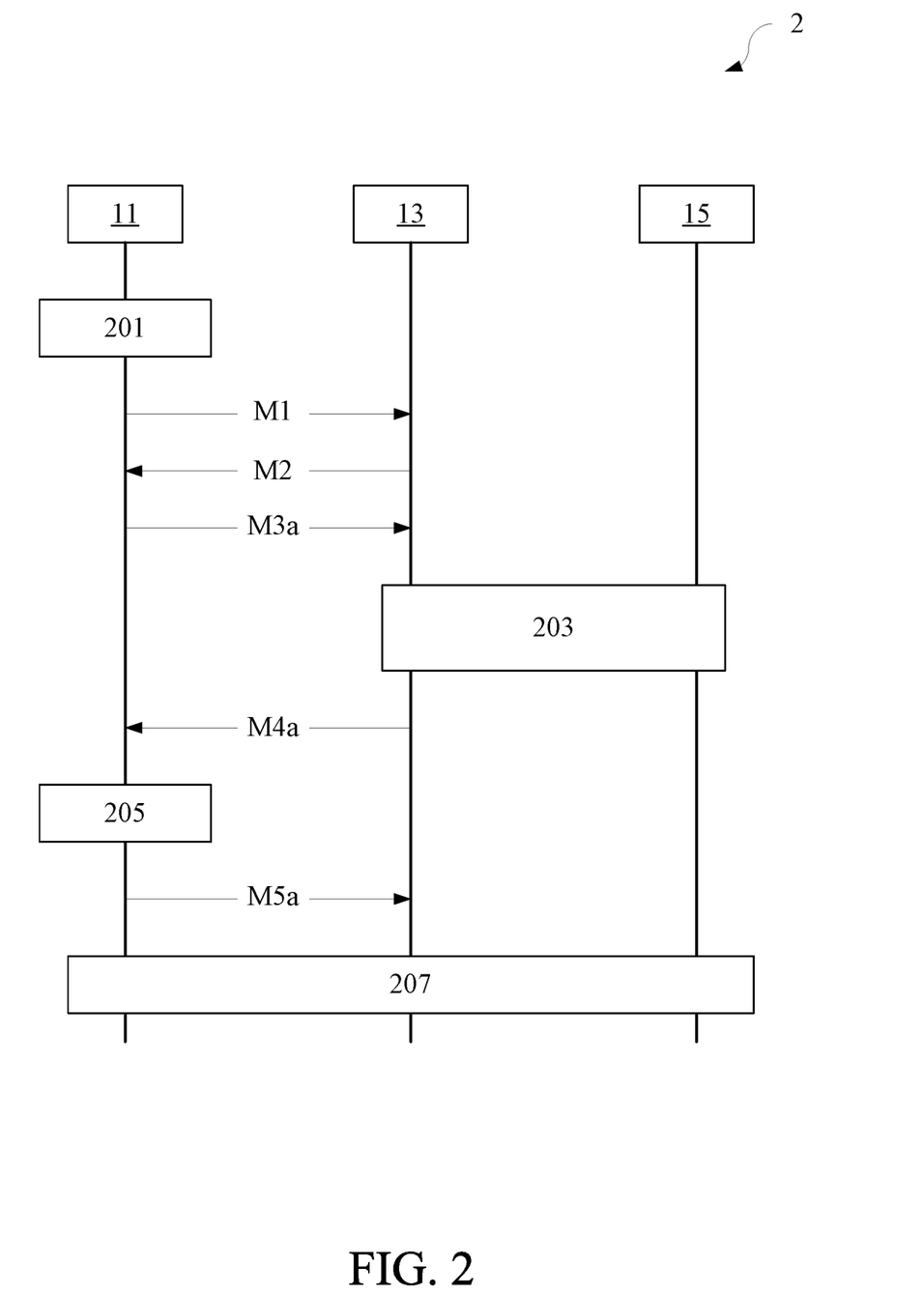
FIG. 2 illustrates a mode where the wireless communication system of FIG. 1 uses a control plane for early data transmission according to some embodiments.

FIG. 2 illustrates a mode 2 where the wireless communication system 1 of FIG. 1 uses the control plane CP for early data transmission according to some embodiments. Contents shown in FIG. 2 are only for illustrating the embodiments of the present invention rather than for limiting the present invention.

Referring to FIG. 2, it is assumed that the user equipment 11 is at an RRC idle mode, and the user equipment 11 and the base station 13 intend to use the control plane CP to perform a random access procedure. First, the user equipment 11 may determine whether to perform the early data transmission in the random access procedure (which is labeled as an operation 201). In some embodiments, the user equipment 11 may decide whether to perform the early data transmission in the following way: determining whether the size of the third message carrying the early uplink data does not exceed a maximum size (e.g., 1000 bits) of a transport block according to the system information broadcasted by the base station 13, deciding to perform the early data transmission if the size does not exceed the maximum size, and deciding not to perform the early data transmission if the size exceeds the maximum size. The maximum size of the transport block may limit the size of the uplink data from the user equipment 11, and the maximum size of the transport block may be for example but not limited to: 328, 408, 504, 584, 680, 808, 936 and 1000 bits. In some embodiments, the user equipment 11 may also decide whether to perform the early data transmission in other ways.

When the user equipment 11 decides to perform the early data transmission with the base station 13, the user equipment 11 may transmit a random access request message M1 to the base station 13. In some embodiments, the user equipment 11 may select a random access channel resource for early data transmission according to the system information from the base station 13, wherein the system information comprises a maximum size of transport block and configuration information of the random access channel resource for the early data transmission. The random access channel resource may be for example but not limited to a NB-IoT physical random access channel (NPRACH). Next, the user equipment 11 may use the random access channel resource to transmit the random access request message M1 to the base station 13. For example, the user equipment 11 may transmit the random access request message M1 according to a Non-Anchor Carrier. Because the random access request message M1 is transmitted using a specific random access channel resource, the base station 13 can learn that the user equipment 11 intends to perform early data transmission in this random access procedure after receiving the random access request message M1. In some embodiments, the user equipment 11 may also use a specific preamble to transmit the random access request message M1 to the base station, thereby notifying the base station 13 that the user equipment 11 intends to perform the early data transmission.

After receiving the random access request message M1, the base station 13 may decide a size limit of uplink data for the user equipment 11. Then, the base station 11 may transmit a random access response message M2 carrying the size limit of the uplink data to the user equipment 11.

After receiving the random access response message M2, the user equipment 11 can learn the size limit of the uplink data. Then, the user equipment 11 may transmit an RRC request message M3a carrying the early uplink data of the user equipment 11 to the base station 13 according to the size limit of the uplink data. In FIG. 2, the RRC request message M3a is an RRC connection request message used by the user equipment 11 for requesting to enter an RRC connected mode. Additionally, the early uplink data carried by the RRC request message M3a may be encapsulated into an Uplink Non-Access Stratum Protocol Data Unit (Uplink NAS PDU), and protected by NAS security. At the absence of the NAS security (e.g., the NAS security expires), the user equipment 11 and the base station 13 do not perform the early data transmission but perform the conventional data transmission.

After the user equipment 11 transmits the RRC request message M3a to the base station 13, the base station 13 may perform signaling transmission with the core network 15 (which is labeled as an operation 203). For example, the operation 203 may basically comprise: transmitting, by the base station 13, a Retrieve UE Information message to the mobility management entity of the core network 15; transmitting, by the mobility management entity, a UE Information transfer message to the base station 13; establishing, by the base station 13, an Access Stratum context (AS context) of the user equipment 11; transmitting, by the base station 13, an initial UE message carrying the early uplink data to the mobility management entity; and transmitting, by the mobility management entity, a downlink NAS transport message to the base station 13. The downlink NAS transport message may optionally carry an early downlink data corresponding to the early uplink data (e.g., a downlink non-access stratum protocol data unit).

After performing the aforesaid signaling transmission with the core network 15, the base station 13 may transmit an RRC response message M4a to the user equipment 11. In FIG. 2, the RRC response message M4a is an RRC connection setup message indicating the setup of enabling the user equipment 11 to enter the RRC connected mode. In some embodiments, if the base station 13 has received the early downlink data (e.g., the downlink non-access stratum protocol data unit) from the core network 15, the base station 13 may carry the early downlink data corresponding to the early uplink data in the RRC response message M4a.

The user equipment 11 may enter the RRC connected mode according to the setup in the RRC response message M4a (which is labeled as an operation 205). After entering the RRC connected mode, the user equipment 11 may transmit an RRC connection completeness message M5a to the base station 13 so as to establish the connection with the base station 13. In some embodiments, the data that the user equipment 11 intends to transmit to the base station 13 cannot be completely transmitted in the RRC request message M3a, and the user equipment 11 may continue to transmit the remaining data after establishing the connection with the base station 13.

After the data transmission between the user equipment 11 and the base station 13 is completed, a resource release operation may be performed (which is labeled as an operation 207). For example, the operation 207 may basically comprise: transmitting, by the base station 13, a UE context release request to the mobility management entity of the core network 15; transmitting, by the mobility management entity, a UE context release command to the base station 13; transmitting, by the base station 13, an RRC release message to the user equipment 11, and transmitting, by the base station 13, a UE context release completeness message to the mobility management entity.

Figure 3:
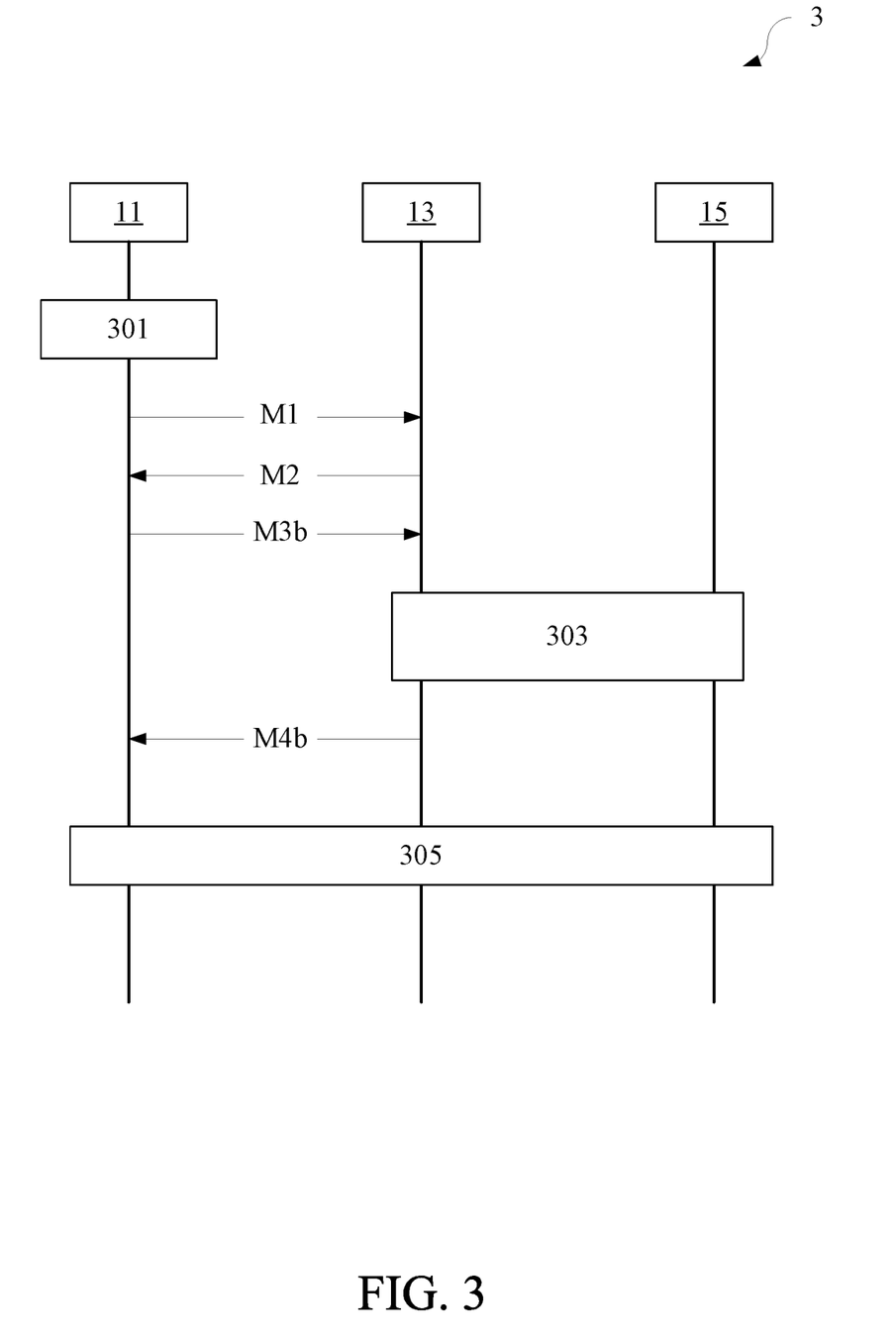
FIG. 3 illustrates another mode where the wireless communication system of FIG. 1 uses the control plane for early data transmission according to some embodiments.

FIG. 3 illustrates another mode 3 where the wireless communication system 1 of FIG. 1 uses the control plane CP for early data transmission according to some embodiments. Contents shown in FIG. 3 are only for illustrating the embodiments of the present invention rather than for limiting the present invention.

Referring to FIG. 3, it is assumed that the user equipment 11 is at an RRC idle mode, and the user equipment 11 and the base station 13 intend to use the control plane CP to perform a random access procedure. First, the user equipment 11 may determine whether to perform the early data transmission in the random access procedure (which is labeled as an operation 301). The operation 301 is the same as the operation 201, so reference may be made to the above description of the operation 201 for contents of the operation 301. As in FIG. 2, in FIG. 3, after the user equipment 11 decides to perform the early data transmission with the base station 13, the user equipment 11 may transmit a random access request message M1 to the base station 13, and the base station 13 may transmit a random access response message M2 to the user equipment 11 after receiving the random access request message M1. Details in the transmission of the random access request message M1 and the random access response message M2 have been described in the above description, and thus will not be further described herein.

After receiving the random access response message M2, the user equipment 11 can learn the size limit of the uplink data. Then, the user equipment 11 may transmit an RRC request message M3*b* carrying the early uplink data of the user equipment 11 to the base station 13 according to the size limit of the uplink data. Different from the RRC request message M3*a* of FIG. 2, the RRC request message M3*b* is an RRC connectionless request message used by the user equipment 11 for requesting not to enter an RRC connected mode. The early uplink data carried by the RRC request message M3*b* may be encapsulated into an uplink Non-Access Stratum Protocol Data Unit (Uplink NAS PDU), and protected by NAS security. At the absence of the NAS security (e.g., the NAS security expires), the user equipment 11 and the base station 13 do not perform the early data transmission but perform the conventional data transmission.

After the user equipment 11 transmits the RRC request message M3*b* to the base station 13, the base station 13 may perform signaling transmission with the core network 15 (which is labeled as an operation 303). For example, the operation 303 may comprise: transmitting, by the base station 13, a Retrieve UE Information message to the mobility management entity of the core network 15; transmitting, by the mobility management entity, a UE Information transfer message to the base station 13; establishing, by the base station 13, an Access Stratum context (AS context) of the user equipment; transmitting, by the base station 13, an initial UE message carrying the early uplink data of the user equipment 11; and transmitting, by the mobility management entity, a UE context release command to the base station 13. In some embodiments, after the base station 13 transmits the initial UE message, the mobility management entity may further transmit a downlink NAS transport message to the base station 13 in addition to the UE context release command, wherein the downlink NAS transport message may carry the early downlink data corresponding to the early uplink data, and the early downlink data is a downlink non-access stratum protocol data unit. In some embodiments, the UE context release command and the downlink NAS transport message may be incorporated into a single S1 Application Protocol message (S1AP message).

After performing the aforesaid signaling transmission with the core network 15, the base station 13 may transmit an RRC response message M4*b* to the user equipment 11. Different from the RRC response message M4*a* of FIG. 2, the RRC response message M4*b* is an RRC connectionless confirmation message for confirming that the user equipment 11 does not enter the RRC connected mode. If the base station 13 has received the early downlink data (e.g., the downlink non-access stratum protocol data unit) corresponding to the early uplink data from the core network 15, the base station 13 may carry the early downlink data in the RRC response message M4*b*.

After the data transmission between the user equipment 11 and the base station 13 is completed, a resource release operation may be performed (which is labeled as an operation 305). For example, the operation 305 may comprise: transmitting, by the user equipment 11, a hybrid automatic repeat request message (HARQ) message to the base station 13, and then transmitting, by the base station 13, a UE context release completeness message to the mobility management entity of the core network 15.

In some embodiments, after the user equipment 11 transmits the RRC request message M3*b* for requesting not to enter the RRC connected mode to the base station 13, the base station 13 still can command the user equipment 11 to enter the RRC connected mode. In this case, the base station 13 may perform the operation 203 as in FIG. 2, and then transmit the RRC response message M4*a* as in FIG. 2 to the user equipment 11. Next, as shown in FIG. 2, the user equipment 11 may enter the RRC connected mode according to the setup of the RRC response message M4*a*, and transmit an RRC connection completeness message M5*a* to the base station 13 for connection with the base station 13. For example, via the indication of the core network 15, the base station 13 may learn whether the uplink data transmission has been completed. If the uplink data transmission has been completed, then the RRC response message M4*b* is transmitted to command the user equipment 11 not to enter the RRC connected mode. If the uplink data transmission has not been completed, then the RRC response message M4*a* is transmitted to command the user equipment 11 to enter the RRC connected mode, and to complete the unfinished data transmission in this mode.

Figure 4:
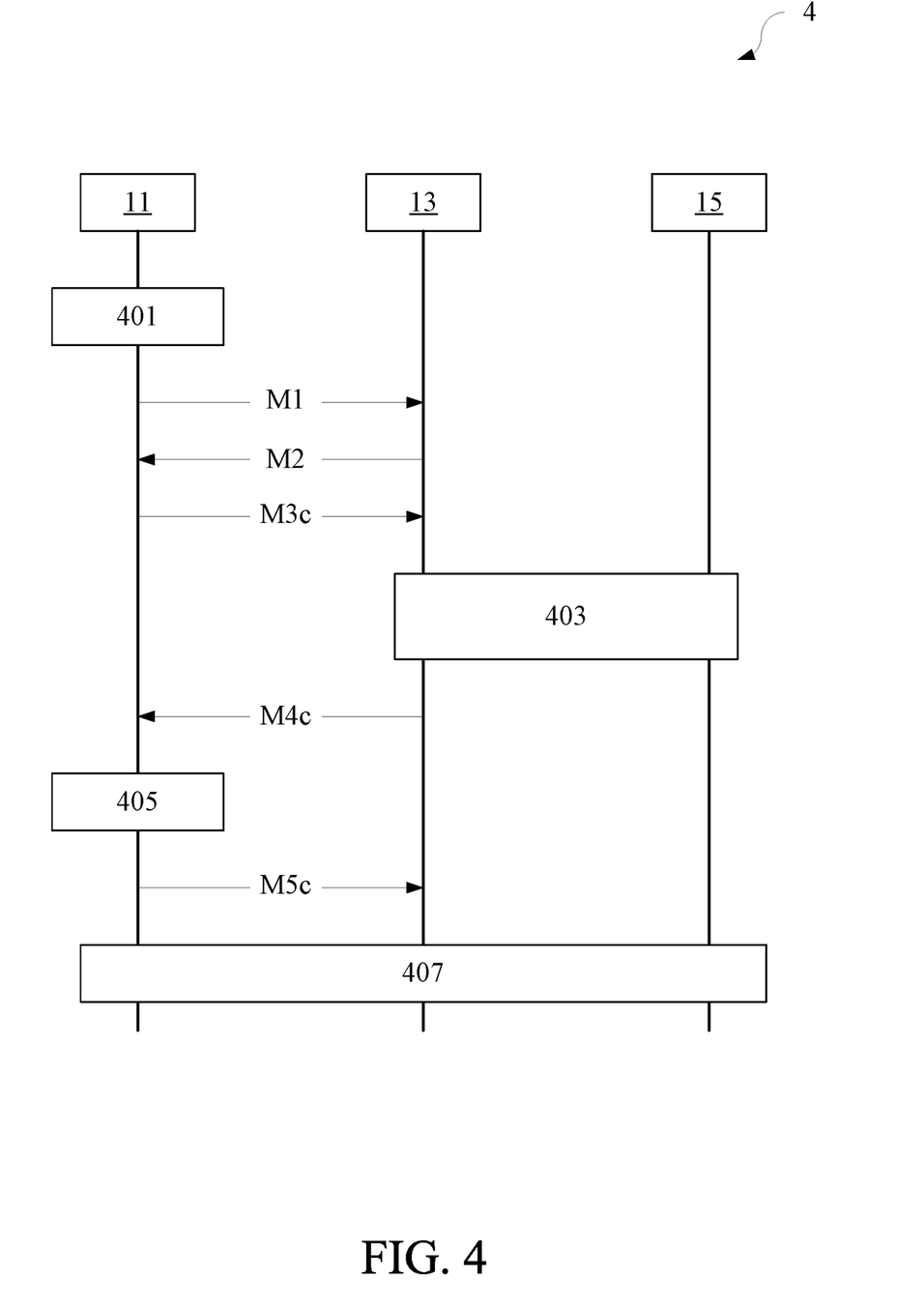
FIG. 4 illustrates a mode where the wireless communication system of FIG. 1 uses a user plane for early data transmission according to some embodiments.

FIG. 4 illustrates a mode 4 where the wireless communication system 1 of FIG. 1 uses a user plane UP for early data transmission according to some embodiments. Contents shown in FIG. 4 are only for illustrating the embodiments of the present invention rather than for limiting the present invention.

Referring to FIG. 4, it is assumed that the user equipment 11 is in an RRC suspension mode, and the user equipment 11 and the base station 13 intend to use the user plane UP to perform a random access procedure. First, the user equipment 11 may determine whether to perform the early data transmission in the random access procedure (which is labeled as an operation 401). The operation 401 is the same as the operation 201, so reference may be made to the above description of the operation 201 for contents of the operation 401. As in FIG. 2, in FIG. 4, after the user equipment 11 decides to perform the early data transmission with the base station 13, the user equipment 11 may transmit a random access request message M1 to the base station 13, and the base station 13 may transmit a random access response message M2 to the user equipment 11 after receiving the random access request message M1. Details in the transmission of the random access request message M1 and the random access response message M2 have been described in the above description, and thus will not be further described herein.

After receiving the random access response message M2, the user equipment 11 may transmit an RRC request message M3c to the base station 13. In FIG. 4, the RRC request message M3c is an RRC connection resume request message used by the user equipment 11 for requesting to enter the RRC connected mode. The early uplink data carried by the RRC request message M3c may be encapsulated into an Uplink Media Access Control Protocol Data Unit (Uplink MAC PDU), and protected by AS security. In some embodiments, at the absence of the AS security (e.g., the AS security expires), the user equipment 11 and the base station 13 do not perform the early data transmission but perform the conventional data transmission.

The user equipment 11 may restore the radio bearer after transmitting the RRC request message M3c to the base station 13. Additionally, after the user equipment 11 transmits the RRC request message M3c to the base station 13, the base station 13 may perform signaling transmission with the core network 15 (which is labeled as an operation 403). For example, the operation 403 may comprise: transmitting, by the base station 13, a UE context resume request message to the mobility management entity of the core network 15; modifying the radio bearer between the mobility management entity and the serving gateway in the core network 15; transmitting, by the mobility management entity, a UE context resume response message to the base station 13; and establishing, by the base station 13, access stratum context and non-access stratum context of the user equipment 11. After establishing the access stratum context and the non-access stratum context of the user equipment 11, the base station 13 may transmit the early uplink data from the user equipment 11 to the serving gateway. In some embodiments, after establishing the access stratum context and the non-access stratum context of the user equipment 11, the base station may also receive the early downlink data of the serving gateway (e.g., Downlink MAC PDU), wherein the early downlink data corresponds to the early downlink data of the user equipment 11.

After performing the aforesaid signaling transmission with the core network 15, the base station 13 may transmit an RRC response message M4c to the user equipment 11. In FIG. 4, the RRC response message M4c is an RRC connection resume setup message indicating the setup of enabling the user equipment 11 to resume the RRC connected mode. In some embodiments, if the base station 13 has received the early downlink data (e.g., Downlink MAC PDU) from the core network 15, the base station 13 may carry the early downlink data corresponding to the early uplink data in the RRC response message M4c.

The user equipment 11 may restore the RRC connected mode according to the setup in the RRC response message M4c (which is labeled as an operation 405). After entering the RRC connected mode, the user equipment 11 may transmit an RRC connection completeness message M5c to the base station 13 so as to establish the connection with the base station 13. In some embodiments, the data that the user equipment 11 intends to transmit to the base station 13 cannot be completely transmitted in the RRC request message M3c, and the user equipment 11 may continue to transmit the remaining data with the serving gateway of the core network 15 after establishing the connection with the base station 13.

After the data transmission between the user equipment 11 and the base station 13 is completed, a resource release operation may be performed (which is labeled as an operation 407). For example, the operation 407 may comprise: transmitting, by the base station 13, a UE context suspension request to the mobility management entity of the core network 15; releasing the radio bearer between the mobility management entity and the serving gateway of the core network 15; transmitting, by the mobility management entity, a UE context suspension response to the base station 13; and transmitting, by the base station 13, an RRC release message carrying an suspension indication to the user equipment 11.

Figure 5:
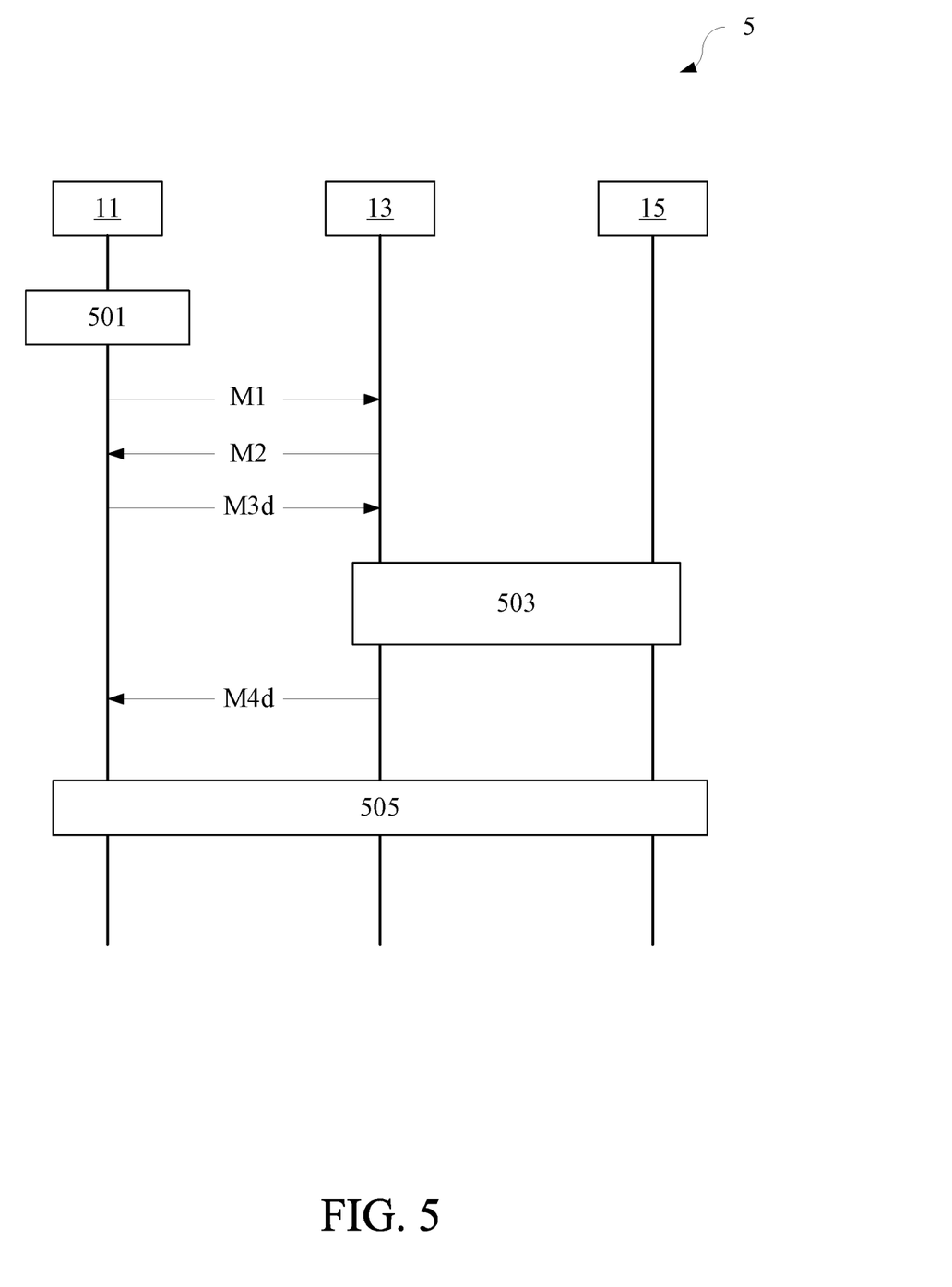
FIG. 5 illustrates another mode where the wireless communication system of FIG. 1 uses the user plane for early data transmission according to some embodiments.

FIG. 5 illustrates another mode 5 where the wireless communication system 1 of FIG. 1 uses the user plane UP for early data transmission according to some embodiments. Contents shown in FIG. 5 are only for illustrating the embodiments of the present invention rather than for limiting the present invention.

Referring to FIG. 5, it is assumed that the user equipment 11 is at an RRC suspension mode, and the user equipment 11 and the base station 13 intend to use the user plane UP to perform a random access procedure. First, the user equipment 11 may determine whether to perform the early data transmission in the random access procedure (which is labeled as an operation 501). The operation 501 is the same as the operation 201, so reference may be made to the above description of the operation 201 for contents of the operation 501. As in FIG. 2, in FIG. 5, after the user equipment 11 decides to perform the early data transmission with the base station 13, the user equipment 11 may transmit a random access request message M1 to the base station 13, and the base station 13 may transmit a random access response message M2 to the user equipment 11 after receiving the random access request message M1. Details in the transmission of the random access request message M1 and the random access response message M2 have been described in the above description, and thus will not be further described herein.

After receiving the random access response message M2, the user equipment 11 can learn the size limit of the uplink data. Then, the user equipment 11 may transmit an RRC request message M3d carrying the early uplink data of the user equipment 11 to the base station 13 according to the size limit of the uplink data. Different from the RRC request message M3c in FIG. 4, the RRC request message M3d is an RRC connectionless resume request message used by the user equipment 11 for requesting not to enter the RRC connected mode. The early uplink data carried by the RRC request message M3d may be encapsulated into an Uplink Media Access Control Protocol Data Unit, and protected by AS security. In some embodiments, at the absence of the AS security (e.g., the AS security expires), the user equipment 11 and the base station 13 do not perform the early data transmission but perform the conventional data transmission.

The user equipment 11 may restore the radio bearer after transmitting the RRC request message M3d to the base station 13. Additionally, after the user equipment 11 transmits the RRC request message M3d to the base station 13, the base station 13 may perform signaling transmission with the core network 15 (which is labeled as an operation 503).

The operation 503 is the same as the operation 403, so reference may be made to the above description of the operation 403 for contents of the operation 503.

After performing the aforesaid signaling transmission with the core network 15, the base station 13 may transmit an RRC response message M4d to the user equipment 11. Different from the RRC response message M4c in FIG. 4, the RRC response message M4d is an RRC connectionless resume confirmation message for confirming that the user equipment 11 does not enter the RRC connected mode. If the base station 13 has received the early downlink data (e.g., Downlink MAC PDU) corresponding to the early uplink data from the core network 15, the base station 13 may carry the early downlink data in the RRC response message M4d.

After the data transmission between the user equipment 11 and the base station 13 is completed, a resource release operation may be performed (which is labeled as an operation 505). For example, the operation 505 may comprise: transmitting, by the user equipment 11, an RRC connectionless completeness message to the base station 13; transmitting, by the base station 13, a UE context suspension request to the mobility management entity of the core network 15; releasing the radio bearer between the mobility management entity and the serving gateway of the core network 15; transmitting, by the mobility management entity, a UE context suspension response to the base station 13; and transmitting, by the base station 13, an RRC release message carrying a suspension indication to the user equipment 11.

In some embodiments, after the user equipment 11 transmits the RRC request message M3d for requesting not to enter the RRC connected mode to the base station 13, the base station 13 still can command the user equipment 11 to enter the RRC connected mode. In this case, the base station 13 may perform the operation 403 as in FIG. 4, and then transmit the RRC response message M4c as in FIG. 4 to the user equipment 11. Next, as shown in FIG. 4, the user equipment 11 may enter the RRC connected mode according to the setup of the RRC response message M4c, and transmit an RRC connection completeness message M5c to the base station 13 for connection with the base station 13. For example, via the indication of the core network 15, the base station 13 may learn whether the uplink data transmission has been completed. If the uplink data transmission has been completed, then the RRC response message M4d is transmitted to command the user equipment 11 not to enter the RRC connected mode. If the uplink data transmission has not been completed, then the RRC response message M4c is transmitted to command the user equipment 11 to enter the RRC connected mode, and to complete the unfinished data transmission in this mode.

Figure 6:
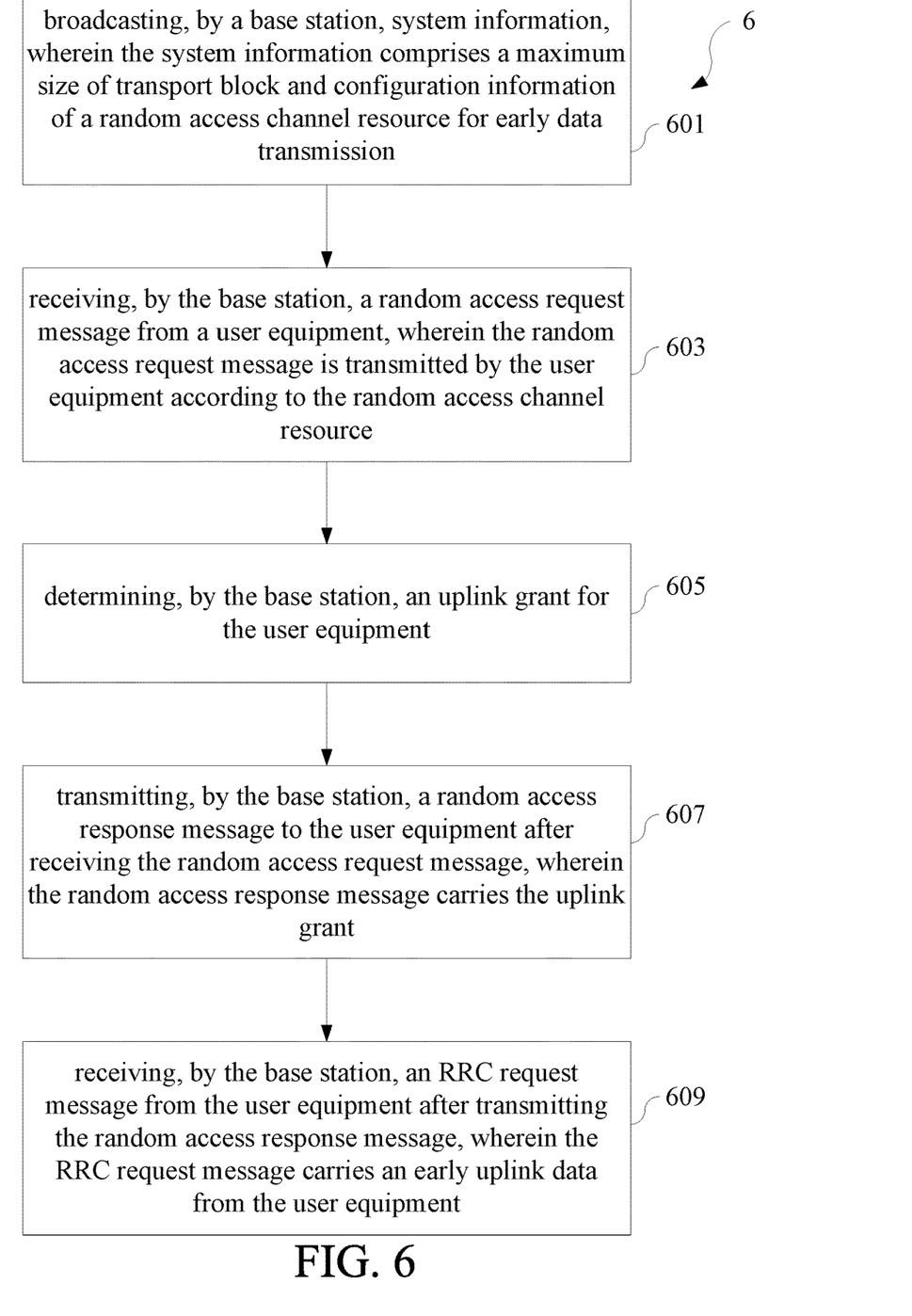
FIG. 6 illustrates a schematic view of a method for early data transmission according to some embodiments.

FIG. 6 illustrates a schematic view of a method for early data transmission according to some embodiments. Contents shown in FIG. 6 are only for illustrating the embodiments of the present invention rather than for limiting the present invention.

Referring to FIG. 6, a method 6 for early data transmission in a random access procedure may comprise:
broadcasting, by a base station, system information, wherein the system information comprises a maximum size of transport block and configuration information of a random access channel resource for the early data transmission (which is labeled as step 601);
receiving, by the base station, a random access request message from a user equipment, wherein the random access request message is transmitted by the user equipment according to the random access channel resource (which is labeled as step 603);
determining, by the base station, an uplink grant for the user equipment (which is labeled as step 605);
transmitting, by the base station, a random access response message to the user equipment after receiving the random access request message, wherein the random access response message carries the uplink grant (which is labeled as step 607); and
receiving, by the base station, an RRC request message from the user equipment after transmitting the random access response message, wherein the RRC request message carries an early uplink data from the user equipment (which is labeled as step 609).

The order in which the steps 601 to 609 of FIG. 6 are executed is not limited. The order in which the steps 601 to 609 of FIG. 6 are executed may be adjusted while it still can be implemented.

In some embodiments, the RRC request message is used to request the use equipment to enter into an RRC connected mode, and a method 6 for early data transmission may further comprise the following steps in addition to the steps 601 to 609:
transmitting, by the base station, an RRC response message to the user equipment after receiving the RRC request message; and
receiving, by the base station, an RRC connection completeness message from the user equipment after transmitting the RRC response message.

In some embodiments, the RRC request message is used to request the use equipment to enter into an RRC connected mode, and the method 6 for transmission may further comprise the following steps in addition to the steps 601 to 609:
transmitting, by the base station, an RRC response message to the user equipment after receiving the RRC request message, wherein the RRC response message carries an early downlink data corresponding to the early uplink data; and
receiving, by the base station, an RRC connection completeness message from the user equipment after transmitting the RRC response message.

In some embodiments, the RRC request message is used to request the user equipment not to enter into an RRC connected mode, and the method 6 for early data transmission may further comprise the following step in addition to the steps 601 to 609:
transmitting, by the base station, an RRC response message to the user equipment after receiving the RRC request message.

In some embodiments, the RRC request message is used to request the user equipment not to enter into an RRC connected mode, and the method 6 for early data transmission may further comprise the following step in addition to the steps 601 to 609:
transmitting, by the base station, an RRC response message to the user equipment after receiving the RRC request message, where the RRC response message carries an early downlink data corresponding to the early uplink data.

In some embodiments, the RRC request message is used to request the user equipment not to enter into an RRC connected mode, and the method 6 for early data transmission may further comprise the following step in addition to the steps 601 to 609:
transmitting, by the base station, an RRC response message to the user equipment after receiving the RRC request message; and receiving, by the base station, an RRC connection completeness message from the user equipment after transmitting the RRC response message.

In some embodiments, the RRC request message is used to request the user equipment not to enter into an RRC connected mode, and the method 6 for early data transmission may further comprise the following step in addition to the steps 601 to 609:

transmitting, by the base station, an RRC response message to the user equipment after receiving the RRC request message, where the RRC response message carries an early downlink data corresponding to the early uplink data; and receiving, by the base station, an RRC connection completeness message from the user equipment after transmitting the RRC response message.

In some embodiments, the base station receives the early uplink data from the user equipment on a control plane, and the method 6 for early data transmission may further comprise the following step in addition to the steps 601 to 609:

transmitting, by the base station, the early uplink data to a core network on the control plane.

In some embodiments, the base station receives the early uplink data from the user equipment on a user plane, and the method 6 for early data transmission may further comprise the following step in addition to the steps 601 to 609:

transmitting, by the base station, the early uplink data to a core network on the user plane.

In some embodiments, the aforesaid all steps of the method 6 for early data transmission may be executed by the wireless communication system 1. In addition to the aforesaid steps, the method 6 for early data transmission may also comprise other steps corresponding to the aforesaid all embodiments of the wireless communication system 1. These other steps shall be appreciated by a person having ordinary skill in the art depending on the above description for the wireless communication system 1, and thus will not be further described herein.

The above disclosure is related to the detailed technical contents and inventive features thereof. A person having ordinary skill in the art may proceed with a variety of modifications and replacements according to the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A base station for performing a random access procedure with a user equipment, comprising:
    a transceiver, being configured to broadcast system information and receive a random access request message from the user equipment, wherein the system information comprises a maximum size of transport block for the user equipment to determine whether to perform early data transmission and configuration information of a random access channel resource for the early data transmission, and the random access request message is transmitted by the user equipment according to the random access channel resource; and
    a processor, being electrically coupled to the transceiver and configured to determine an uplink grant for the user equipment;
    wherein the transceiver is configured to further:
    transmit a random access response message to the user equipment after receiving the random access request message, wherein the random access response message carries the uplink grant;
    receive a radio resource control (RRC) request message from the user equipment after transmitting the random access response message, wherein the RRC request message carries an early uplink data from the user equipment, and the RRC request message is used to request the user equipment not to enter into an RRC connected mode;
    transmit an RRC response message to the user equipment after receiving the RRC request message, wherein the RRC response message indicates the user equipment to enter the RRC connected mode; and
    receive an RRC connection completeness message from the user equipment after transmitting the RRC response message.

2. The base station of claim 1, wherein the RRC response message carries an early downlink data corresponding to the early uplink data.

3. The base station of claim 1, wherein the transceiver receives the early uplink data from the user equipment on a control plane, and transmits the early uplink data to a core network on the control plane.

4. The base station of claim 1, wherein the transceiver receives the early uplink data from the user equipment on a user plane, and transmits the early uplink data to a core network on the user plane.

5. A user equipment for performing a random access procedure with a base station, comprising:
    a processor, being configured to determine whether to perform early data transmission according to a maximum size of transport block comprised in system information from the base station, and select a random access channel resource for the early data transmission according to configuration information of the random access channel resource comprised in the system information when deciding to perform the early data transmission; and
    a transceiver, being electrically coupled to the processor and configured to:
    transmit a random access request message to the base station according to the random access channel resource;
    receive a random access response message from the base station after transmitting the random access request message, wherein the random access response message carries a uplink grant;
    transmit an RRC request message to the base station according to the uplink grant after receiving the random access response message, wherein the RRC request message carries an early uplink data, and the RRC request message is used to request the user equipment not to enter into an RRC connected mode;
    receive an RRC response message from the base station after transmitting the RRC request message, wherein the RRC response message indicates the user equipment to enter the RRC connected mode; and
    transmit an RRC connection completeness message to the base station after receiving the RRC response message.

6. The user equipment of claim 5, wherein the RRC response message carries an early downlink data corresponding to the early uplink data.

7. The user equipment of claim 5, wherein the transceiver transmits the early uplink data to the base station on a control plane or on a user plane.

8. A method for early data transmission in a random access procedure, comprising:

broadcasting, by a base station, system information, wherein the system information comprises a maximum size of transport block for a user equipment to determine whether to perform the early data transmission and configuration information of a random access channel resource for the early data transmission;

receiving, by the base station, a random access request message from the user equipment, wherein the random access request message is transmitted by the user equipment according to the random access channel resource;

determining, by the base station, an uplink grant for the user equipment;

transmitting, by the base station, a random access response message to the user equipment after receiving the random access request message, wherein the random access response message carries the uplink grant;

receiving, by the base station, an RRC request message from the user equipment after transmitting the random access response message, wherein the RRC request message carries an early uplink data from the user equipment, and the RRC request message is used to request the user equipment not to enter into an RRC connected mode;

transmitting, by the base station, an RRC response message to the user equipment after receiving the RRC request message, wherein the RRC response message indicates the user equipment to enter the RRC connected mode; and receiving, by the base station, an RRC connection completeness message from the user equipment after transmitting the RRC response message.

9. The method for early data transmission according to claim 8, wherein the RRC response message carries an early downlink data corresponding to the early uplink data.

10. The method for early data transmission according to claim 8, wherein the base station receives the early uplink data from the user equipment on a control plane, and the method further comprises:

transmitting, by the base station, the early uplink data to a core network on the control plane.

11. The method for early data transmission according to claim 8, wherein the base station receives the early uplink data from the user equipment on a user plane, and the method further comprises:

transmitting, by the base station, the early uplink data to a core network on the user plane.

* * * * *